US009668178B2

(12) United States Patent
Vesterinen et al.

(10) Patent No.: US 9,668,178 B2
(45) Date of Patent: May 30, 2017

(54) PROVIDING MOBILITY CONTROL FOR LOCAL AREA NETWORKS

(75) Inventors: Seppo Ilmari Vesterinen, Oulunsalo (FI); Yang Liu, Beijing (CN); Haitao Li, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 201 days.

(21) Appl. No.: 14/367,301

(22) PCT Filed: Dec. 21, 2011

(86) PCT No.: PCT/CN2011/084387
§ 371 (c)(1),
(2), (4) Date: Jun. 20, 2014

(87) PCT Pub. No.: WO2013/091200
PCT Pub. Date: Jun. 27, 2013

(65) Prior Publication Data
US 2014/0370897 A1 Dec. 18, 2014

(51) Int. Cl.
*H04W 36/00* (2009.01)
*H04W 36/08* (2009.01)
(Continued)

(52) U.S. Cl.
CPC ... *H04W 36/0033* (2013.01); *H04W 36/0055* (2013.01); *H04W 36/08* (2013.01);
(Continued)

(58) Field of Classification Search
CPC ..... H04W 36/30; H04W 36/32; H04W 36/18; H04W 36/04; H04W 88/06; H04W 80/04;
(Continued)

(56) References Cited

U.S. PATENT DOCUMENTS 8,538,430 B1* 9/2013 Filiatrault et al. ............ 455/436
2006/0111111 A1* 5/2006 Ovadia ............... H04L 41/0213
455/439

(Continued)

FOREIGN PATENT DOCUMENTS

CN 101577928 A 11/2009
CN 102131250 A 7/2011
(Continued)

OTHER PUBLICATIONS

Xu Xiadong, et al.; "Handover Mechanism in Coordinated Mulit-Point Transmission / Reception System"; ZTE Communications; XP055134194; pp. 31-35; Jan. 1, 2010.
(Continued)

*Primary Examiner* — Steve D Agosta
(74) *Attorney, Agent, or Firm* — Harrington & Smith (57) ABSTRACT

Provided are methods, corresponding apparatuses, and computer program products for providing mobility control for local area networks. A method includes connecting a user equipment to a first base station, wherein the first base station and the use equipment are connected with a second base station; and disconnecting the first base station from the second base station and connecting the first base station to a third base station during a handover of the user equipment from the second base station to the third base station. With the claimed inventions, mobility of a user equipment in local area networks can be well controlled and thus service continuity would be maintained, resulting in a robust user experience.

7 Claims, 5 Drawing Sheets

(51) Int. Cl.
*H04W 92/20* (2009.01)
*H04W 36/18* (2009.01)
*H04W 84/04* (2009.01)

(52) U.S. Cl.
CPC .......... *H04W 36/18* (2013.01); *H04W 84/045* (2013.01); *H04W 92/20* (2013.01)

(58) Field of Classification Search
CPC ................. H04W 28/04; H04W 84/12; H04L 2012/5607; H04L 1/06
USPC ........ 455/41.2, 41.3, 436–444, 552.1, 553.1; 370/310.2, 331–334, 338, 328
See application file for complete search history.

(56) References Cited

U.S. PATENT DOCUMENTS

| | | | |
|---|---|---|---|
| 2009/0029645 A1* | 1/2009 | Leroudier | H04B 7/2606 455/7 |
| 2009/0061873 A1* | 3/2009 | Bao et al. | 455/436 |
| 2010/0056149 A1* | 3/2010 | Jubin et al. | 455/436 |
| 2010/0056177 A1* | 3/2010 | Kojima | 455/456.1 |
| 2010/0093358 A1* | 4/2010 | Cheong et al. | 455/444 |
| 2010/0113067 A1* | 5/2010 | Fullam et al. | 455/456.3 |
| 2010/0130210 A1* | 5/2010 | Tokgoz et al. | 455/437 |
| 2010/0189074 A1* | 7/2010 | Liao | H04W 36/0055 370/331 |
| 2010/0254344 A1* | 10/2010 | Wei et al. | 370/330 |

FOREIGN PATENT DOCUMENTS

| | | |
|---|---|---|
| EP | 2337400 A1 | 6/2011 |
| WO | WO 2009/132824 A2 | 11/2009 |
| WO | WO2011018890 A1 | 2/2011 |

OTHER PUBLICATIONS

3GPP TS 36.300 V10.5.0 (Sep. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TS 36.331 V10.3.0 (Sep. 2011); 3rd Generation Partnership Project; Technical Specification Group Radio Access Network; Evolved Universal Terrestrial Radio Access (E-UTRA); Radio Resource Control (RRC); Protocol specification (Release 10).

\* cited by examiner

Prior Art

PROVIDING MOBILITY CONTROL FOR LOCAL AREA NETWORKS

FIELD OF THE INVENTION

Embodiments of the present invention generally relate to wireless communication techniques including the 3GPP (the 3rd Generation Partnership Project) LTE technique. More particularly, embodiments of the present invention relate to methods, apparatuses, and computer program products for providing mobility control for LAN networks.

BACKGROUND OF THE INVENTION

The 3GPP has been pursuing the goals of improving communication efficiency, lowering costs, improving services, making use of new spectrum opportunities, and achieving better integration with other open standards. These goals have been visualized into two aspects, i.e., WAN network evolution and LAN network evolution. Under the LTE standard, WAN networks are generally referred to as LTE macro networks covered by e.g., macro eNBs, and are mostly deployed and managed by operators on licensed spectrums. LAN networks, also referred to as LTE-LAN networks, consist of for example picocells or femtocells (i.e., home-eNB cells) that operate in dedicated spectrums and focus more on local area features for residential/enterprise/public hotspot use cases.

In communication architecture involving the above LTE-LAN networks, a network element, also referred to as a SN, has been located at a CN side and configured to provide support/control/maintenance functionalities to the LTE-LAN networks. An LTE-LAN BS, e.g., a home-eNB as above mentioned, has been located at a RAN network side and enables a UE to access to the LTE-LAN network. Under such architecture, the UE could be in connection with both the macro eNB and the LTE-LAN BS, which are known as "dual radio connections." The connection with the macro eNB needs to be more stable and prudently managed such that the UE could not easily get disconnected. In contrast, the connection with the LTE-LAN BS is more endeavored to provide high speed data services for the UE in the local area. There may be a backhaul connection between the macro eNB and the LTE-LAN BS such that data transmitted by the UE to the LTE-LAN BS may be forwarded to the CN side via the macro eNB.

The services as provided by the LTE-LAN ES may include but are not limited to wireless display, LIPA, wireless storage, high speed data downloading and so on. Some of these local services, e.g., high speed data downloading, may also be supported by the macro eNB. In this case, when the UE is moving out of the coverage area of the LTE-LAN BS and entering into the coverage area of the macro eNB, its local service can be retained due to service support from the macro eNB. For a better understanding of the above dual radio connections and problems that may arise therein, discussion will be made in connection with FIG. 1.

Figure 1:
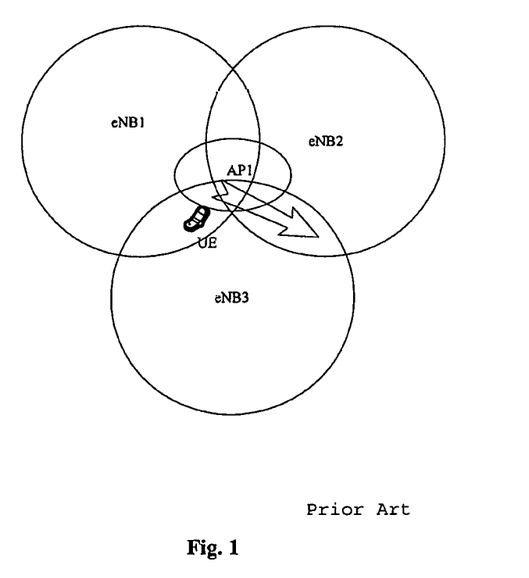
FIG. 1 is a schematic diagram illustrating an exemplary scenario in which a UE is in dual radio connections and embodiments of the present invention may be practiced.

FIG. 1 illustrates a handover scenario in which a UE keeps in connections with a macro eNB 1 and a LAN AP 1 (i.e., a LTE-LAN BS) via two RRC connections, i.e., dual radio connections. As illustrated in FIG. 1, the coverage areas of eNBs 1 to 3 are represented by circles and the coverage area of the AP 1 is represented by an ellipse. It can be seen from FIG. 1 that the eNBs may provide wider coverage area than the AP. When the UE is leaving the coverage areas of the eNB 1 and the AP 1 and moving towards the common coverage areas of the macro eNBs 2 and 3, as illustrated by an arrow, both the eNB 1 and AP 1 may initiate respective handover procedures and then select respective handover target BSs or eNBs. Due to their diverse implementations, the eNB 1 and AP 1 may have different handover criterions and thus may select different target BSs. For example, the eNB 1 may select the eNB 2 as a target BS and the AP 1 may select the eNB 3 as a target BS, and then subsequent to the handover procedure, the UE would keep in RRC connections with the macro eNBs 2 and 3 contemporaneously, which is undesirable in the LTE system and may boil down to bad mobility control.

In addition, although not illustrated in FIG. 1, there may be a scenario in which the UE in the dual radio connections may enter into the coverage area of another AP which may provide a better or more robust service than the serving AP. Efficiently dealing with this scenario is crucial for providing the UE with flexible and sufficient mobility.

In view of the above, it may be desirable to provide methods, apparatuses, and computer program products for providing mobility control for LAN networks, by which the UE's mobility under the dual radio connections would be very well controlled and thus service continuity can be maintained without impacting user experiences.

SUMMARY OF THE INVENTION

Therefore, there is a need in the art to provide for an efficient way of providing mobility control for LAN networks. Due to efficient mobility control, service continuity would be maintained together with a more robust user experience.

These and other problems are generally solved or circumvented, and technical advantages are generally achieved, by embodiments of the present invention, which include methods, apparatuses, and computer program products for providing mobility control for LAN networks.

In an exemplary embodiment of the present invention, a method is provided, which comprises connecting a user equipment to a first base station, wherein the first base station and the use equipment are connected with a second base station. The method also comprises disconnecting the first base station from the second base station and connecting the first base station to a third base station during a handover of the user equipment from the second base station to the third base station.

In one embodiment, the first base station is a macro base station, the second base station is a local area network source base station, and the third base station is a local area network target base station.

In another embodiment, the method further comprises connecting the user equipment to the third base station after the handover and upon disconnection of the user equipment from the first base station.

In an additional embodiment, prior to disconnection of the user equipment from the first base station, the method further comprises handing over the user equipment from the first base station to the third base station; or transmitting to the third base station context data of the user equipment in connection with the first base station.

In a further embodiment, the first base station is a local area network base station, the second base station is a macro source base station, and the third base station is a macro target base station.

In an additional exemplary embodiment of the present invention, an apparatus is provided, which comprises means for connecting a user equipment to a first base station, wherein the first base station and the use equipment are connected with a second base station. The apparatus also comprises means for disconnecting the first base station from the second base station and connecting the first base station to a third base station during a handover of the user equipment from the second base station to the third base station.

In one exemplary embodiment of the present invention, an apparatus is provided, which comprises at least one processor and at least one memory including computer program code. The memory and the computer program code are configured to cause the apparatus to connect a user equipment to a first base station, wherein the first base station and the use equipment are connected with a second base station. The memory and the computer program code are also configured to cause the apparatus to disconnect the first base station from the second base station and connecting the first base station to a third base station during a handover of the user equipment from the second base station to the third base station.

In one exemplary embodiment of the present invention, a computer program product is provided, which, comprises at least one computer readable storage medium having a computer readable program code portion stored thereon. The computer readable program code portion comprises program code instructions for connecting a user equipment to a first base station, wherein the first base station and the use equipment are connected with a second base station. The computer readable program code portion also comprises program code instructions for disconnecting the first base station from the second base station and connecting the first base station to a third base station during a handover of the user equipment from the second base station to the third base station.

According to certain embodiments of the present invention, mobility of a user equipment across local area networks can be well controlled, resulting in a seamless handover and transmission switching. Additionally, the user equipment would not experience service discontinuity so that a good user experience can be retained.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The embodiments of the invention that are presented in the sense of examples and their advantages are explained in greater detail below with reference to the accompanying drawings, in which.

DETAILED DESCRIPTION OF EMBODIMENTS

Embodiments of the present invention propose an efficient mechanism of providing mobility control for LAN networks such that a seamless handover and transmission switching can be accomplished under the dual radio connections. In an embodiment, during a handover procedure of a UE from a source LAN-BS to a target LAN-BS, data initially transmitted from the UE to the source LAN-BS, which may in turn forward the data to a serving macro BS, will be switched to transmit to the target LAN-BS. That is, a connection will be established between the target LAN-BS and the serving macro BS. In another embodiment, during a handover procedure of a UE from a source macro BS to a target macro BS, data initially transmitted from a serving LAN-BS to the source macro BS will be switched to transmit to the target macro BS. That is, a connection will be established between the serving LAN-BS and the target macro BS. In this manner, transmission and service continuity in the LAN networks could be maintained and not subject to traffic interruption.

Before detailed description of various embodiments of the present invention, it should be noted that the acronyms BS, NB, and eNB may refer generally to equipment providing the wireless network interface in a cellular wireless system, and thus will be used interchangeably throughout the specification and claims.

Embodiments of the present invention will be described in detail as below.

FIG. 1 is a schematic diagram illustrating an exemplary scenario of a UE being in dual radio connections, which has been previously discussed and thus its description is omitted herein for conciseness.

Figure 2:
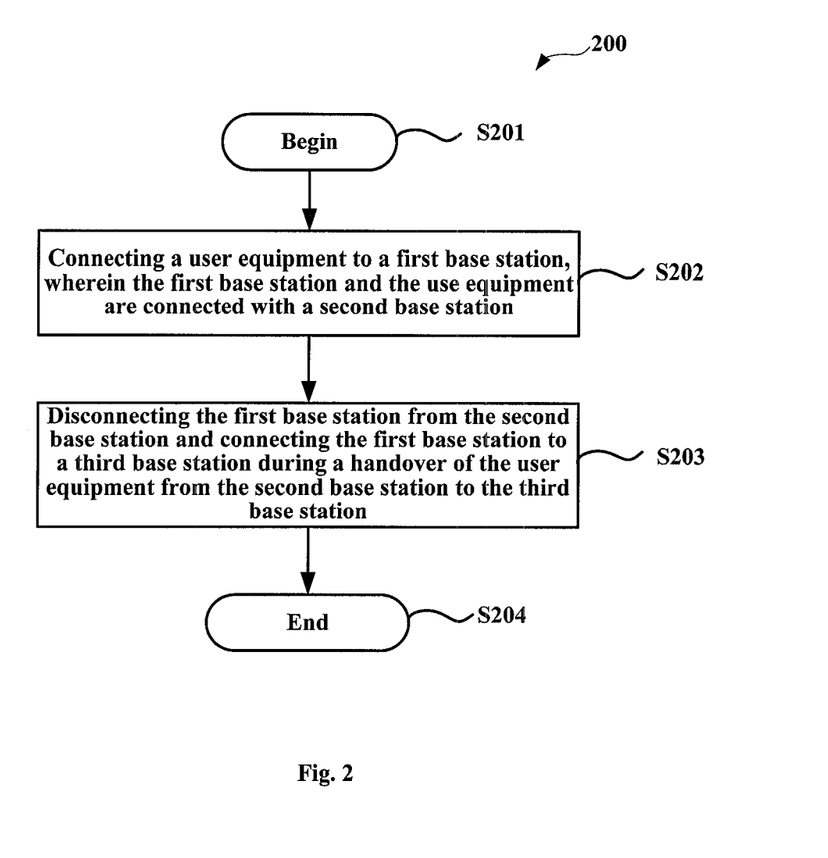
FIG. 2 is a flow chart schematically illustrating a method for providing mobility control for LAN networks according to another embodiment of the present invention.

FIG. 2 is a flow chart schematically illustrating a method 200 for providing mobility control for LAN networks according to an embodiment of the present invention. As illustrated in FIG. 2, the method 200 begins at step S201 and proceeds to step S202, at which the method 200 connects a UE to a first BS, wherein the first BS and the UE are connected with a second BS.

Upon connection of the UE with the first BS, the method 200 proceeds to step S203, at which the method 200 disconnects the first BS from the second BS and connects the first BS to a third BS during a handover of the UE from the second BS to the third BS.

Finally, the method 200 ends at step 204.

Although not illustrated in FIG. 2, in one embodiment, the first BS is a macro BS, the second BS is a LAN source BS, and the third BS is a LAN target BS. By performance of step S202, the UE may communicate with the macro BS and LAN source BS both, thereby forming the dual radio connections as discussed before. When the source LAN BS detects, via e.g., a measurement report, that the UE may enter into the LAN target BS, it may initiate a handover procedure with the target LAN BS so as to hand over the UE thereto. During this handover procedure, the source LAN BS may release the connection with the macro BS, which in turn, would establish a connection with the target LAN BS such that transmission from the UE will be received by the target LAN BS and then forwarded to the CN via the macro BS. This way, the transmission from the UE would not be lost or interrupted due to such an inter-LAN BS handover procedure.

In another embodiment, the first base station is a LAN BS, the second BS is a macro source BS, and the third BS is a macro target BS. Similarly, by performance of step S202, dual radio connections may also be formed for the UE. When the macro source BS detects that the UE may enter into the macro target BS, it may initiate a handover procedure with the macro target BS so as to hand over the UE thereto. During this handover procedure, the serving LAN BS may release the connection with the macro source BS and establish a connection with the macro target BS such that data from the UE will be transmitted to the macro target BS via the serving LAN ES. Likewise, transmission from the UE would not be lost or interrupted due to such an inter-macro BS handover procedure.

In the above embodiment in which the first base station is a LAN BS, the second BS is a macro source BS, and the third BS is a macro target BS, the method 200 may further comprise connecting the UE to the macro target BS after the handover and upon disconnection of the UE from the LAN BS. In this manner, the UE may release its connection with the LAN BS and connect to the same macro target BS as the result of the above handover such that the problem (i.e., two macro target BSs) as discussed with the FIG. 1 would not arise.

To guarantee the UE's service continuity, prior to disconnecting the UE from the LAN BS, the method 200 may further comprise handing over the UE from the LAN BS to the macro target BS or transmitting to the macro target BS context data of the UE in connection with the LAN BS.

Figure 3:
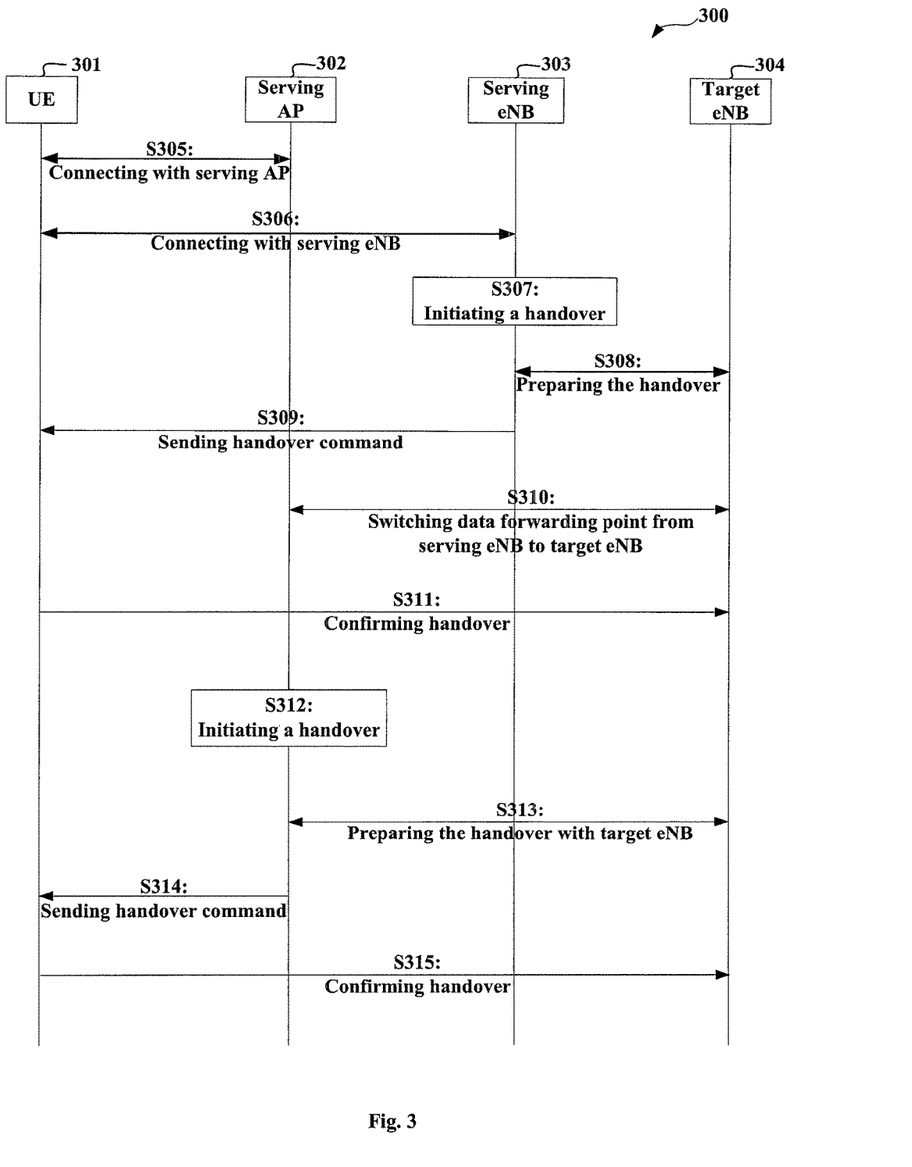
FIG. 3 is a flow chart schematically illustrating a method for providing mobility control for LAN networks according to an embodiment of the present invention.

Attention is now directed to FIG. 3, which is a flow chart schematically illustrating a method 300 for providing mobility control for LAN networks according to another embodiment of the present invention. As illustrated in FIG. 3, the method 300 begins at step S305, wherein a serving AP 301 (i.e., an LTE-LAN ES) establishes a connection with a UE 301 when the UE 301 is within its coverage area and requests for local services. Then, the method proceeds to step S306, at which the method 300 connects the UE 301 with a macro serving eNB 303 (i.e., a macro source BS). It is apparent that, subsequent to the above connecting steps, dual radio connections have been formed. Although not depicted herein, it should be understood that there exists a backhaul connection between the serving AP 302 and the serving eNB 303 such that communication data from the UE 301 can be forwarded, via the serving AP 302 through the backhaul connection, to the serving eNB 303, and which, in turn, transmits the communication data to the CN.

Under the situation that dual radio connections have been established, the method 300 proceeds to step S307, at which the serving eNB 303 detects, e.g., by a measurement report received from the UE 301, that the UE 301 is about to leave its coverage area, and thus initiate a handover procedure with a target eNB 304. Then, at step S308, both the serving eNB 303 and the target eNB 304 perform a handover preparation procedure therebetween.

Following completion of the handover preparation, the method 300 proceeds to step S309, at which the serving eNB 303 sends a handover command to the UE 301 to instruct it that a handover will be conducted upon it. After that, the method 300 proceeds to step S310, at which a negotiation procedure will be initiated and performed between the serving AP 302, serving eNB 303 and target eNB 304 such that the serving AP 302 could disconnect from the serving eNB 303 and then connect to the target eNB 304, thereby forming a backhaul connection. In other words, the target eNB 304 would act, in place of the source eNB 303 which acts as an initial data forwarding point, as a new data forwarding point for forwarding communication traffic from the UE 301 to the CN via the backhaul connection. Upon switching the data forwarding point, the method 300 advances to step S311, at which the UE 301 sends a handover confirmation indication or message to the target eNB 304. By this confirmation message, the UE 301 will disconnect the RRC connection from the serving eNB 303 and connect to the target eNB 304.

Upon performance of the above steps, an inter-macro BS handover procedure has been successfully completed. It can be noted that, due to timely transmission switching, services as "enjoyed" by the UE 301 may not be susceptible to interruption during this inter-macro BS handover, which leads to a robust user experience.

After the above the inter-macro BS handover procedure, the method 300, over time, proceeds to step S312, at which the serving AP 302 initiates a handover procedure which quite possibly could be due to the UE 301 traveling outside its coverage area. This handover procedure can be conducted towards the serving eNB, i.e., the target eNB 304. To this end, at step S313, the serving AP 302 initiates a handover preparation procedure with the target eNB 304. After that, the method 300 proceeds to step S314, at which the serving AP 302 sends a handover command to the UE 301, which in turn, at step S315, sends a handover confirmation indication to the target eNB 304. Until now, the serving AP 302 successfully hands over the UE 301 to the target eNB 304, with which the UE 301 has already kept an RRC connection resulting from the previous handover completed at step S311. Due to this already-kept RRC connection, the UE 301 may send the handover confirmation indication in a different manner. For example, this handover confirmation indication could be a new RRC message which might not require a RACH procedure in the target eNB 304 because the UE 301 has already been in an RRC connected state to its serving eNB (i.e., the target eNB 304 at this moment).

Based upon the second handover procedure proceeding from the step S312 to step S315, the UE 301, as served by the serving AP 302, has been successfully handed over to the target eNB 304 as previously selected by the serving (or source) eNB 303. This way, the problem of the UE simultaneously connecting to two different macro eNBs can be overcome or avoided and mobility of the UE in LAN networks can be very well controlled and supported. In addition, although not depicted in FIG. 3, it would be preferable that, during the second handover procedure, the UE 301 apprises the serving AP 302 of the serving BS/eNB ID (e.g., ECGI) which may assist the serving AP 302 in discerning the serving BS/eNB.

Figure 4:
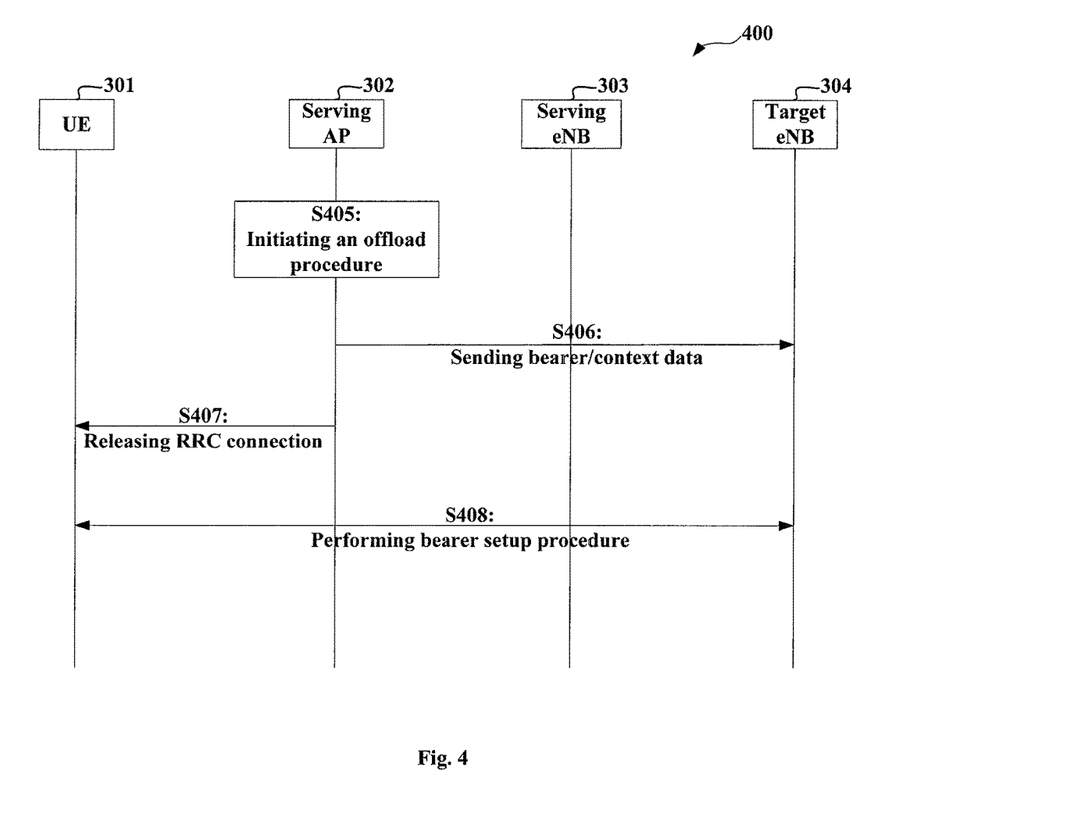
FIG. 4 is a flow chart schematically illustrating a method for providing mobility control for LAN networks according to another embodiment of the present invention.

FIG. 4 is a flow chart schematically illustrating a method 400 for providing mobility control for LAN networks according to another embodiment of the present invention. It should be noted that the method 400 also comprises steps as identical to the steps S305-S311 as illustrated in FIG. 3; thus, for a conciseness purpose, these steps are not depicted and discussed herein. Further, the steps S405 to S408 as illustrated in FIG. 4 are, as a whole, alternatives to the steps S312 to S315 as depicted in FIG. 3. Below is a detailed description with respect to FIG. 4.

Following completion of handing over the UE 301 to the target 304, as discussed in connection with FIG. 3, the method 400 proceeds to step S405, wherein given that the UE 301 is moving outside its coverage area, the serving AP 302, may initiate an offload procedure which is alternative to the second handover procedure in the method 300. During this offload procedure, the serving AP 302, at step S406, sends bearer/context data to the target eNB 304 through the backhaul connection as discussed before. After that, when the UE 401 is moving beyond the coverage area of the serving AP 302, the RRC therebetween stands no chance of being maintained and would have to be released at step S407. After release of the RRC connection between the UE 301 and the serving AP 302, the method 400 advances to step S408, at which the target eNB 304, also the present serving eNB, will perform bearer setup procedure with the UE 301. In other words, the target eNB 304, based upon the previously received context data, establishes radio bearer with the UE 301 to begin communicating with the UE 301 so as to provide access to the CN.

The foregoing has discussed, in connection with FIGS. 3 and 4, the methods 300 and 400, which may involve further implemental details or variants of the method 200; however, the present invention is not limited thereto. Further, it should be noted herein that the steps as illustrated FIGS. 3 and 4 are only examples and are not restrictive to the present invention. Those skilled in the art, after reading the present specification, can change these steps, for example, by combining or adding certain steps, so as to meet different application demands.

Figure 5:
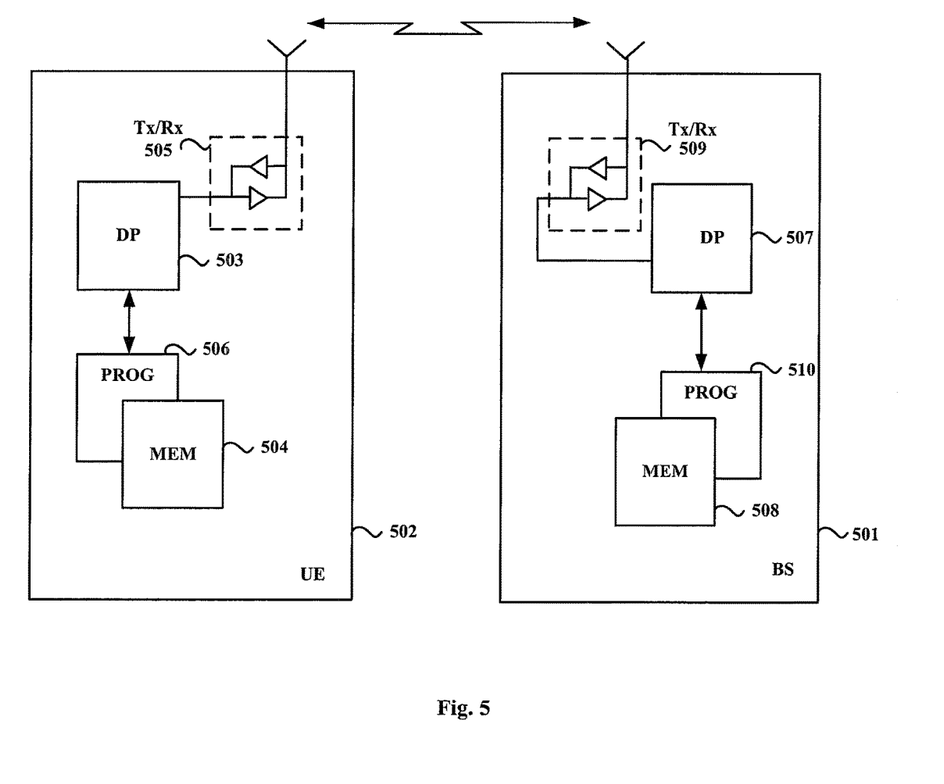
FIG. 5 is a schematic block diagram of a BS and a UE that are suitable for use in practicing the exemplary embodiments of the present invention.

FIG. 5 illustrates a simplified block diagram of a BS 501 and a UE 502 that are suitable for use in practicing the exemplary embodiments of the present invention. In FIG. 5, a wireless network is adapted for communication with the UE 502, also referred to as the LTE-LAN UE, via the BS 501, also referred to as the LTE-LAN BS (or eNB) or LTE macro BS (or eNB). The UE 502 includes a data processor (DP) 503, a memory (MEM) 504 coupled to the DP 503, and a suitable RF transmitter TX and receiver RX 505 (which need not to be implemented in a same component) coupled to the DP 503. The MEM 504 stores a program (PROG) 506. The TX/RX 505 is for bidirectional wireless communications with the BS 501. Note that the TX/RX 505 has at least one antenna to facilitate communication; multiple antennas may be employed for multiple-input multiple-output MIMO communications in which case the UE 502 may have multiple TXs and/or RXs.

The BS 501 includes a data processor (DP) 507, a memory (MEM) 508 coupled to the DP 507, and a suitable RF transmitter TX and receiver RX 509 coupled to the DP 507. The MEM 508 stores a program (PROG) 510. The TX/RX 509 is for bidirectional wireless communications with the UE 502. Note that the TX/RX 509 has at least one antenna to facilitate communication, though in practice a BS will typically have several. The BS 501 may be coupled via a data path to one or more external networks or systems, such as the Internet, for example.

At least one of the PROGs 506 and 510 is assumed to include program instructions that, when executed by the associated DPs 503 and 507, enable the UE 502 and BS 501 to operate in accordance with the exemplary embodiments of the present invention, as discussed herein with the methods 200, 300, and 400.

In general, the various embodiments of the UE 502 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of the present invention may be implemented by computer software executable by one or more of the DPs 503, 507 of the UE 502 and the BS 501, or by hardware, or by a combination of software and hardware.

The MEMs 504 and 508 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the BS 501 or UE 502, there may be several physically distinct memory units in the BS 501 or UE 502. The DPs 503 and 507 may be of any type suitable to the local technical environment, and may include one or more of general purpose computers, special purpose computers, microprocessors, digital signal processors (DSPs) and processors based on multicore processor architecture, as non-limiting examples. Either or both of the UE 502 and the BS 501 may have multiple processors, such as for example an application specific integrated circuit chip that is slaved in time to a clock which synchronizes the main processor.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

Various abbreviations that appear in the specification and/or in the drawing figures are defined as below:
AP Access Point
BS Base Station
CN Core Network
LTE Long Term Evolution
NB Node B
eNB evolved Node B
LAN Local Area Network
UE User Equipment
RRC Radio Resource Control
RACH Random Access Channel
LAN Local Area Network
LIPA Local Internet Protocol Access
WAN Wide Area Network
RAN Radio Access Network
ECGI E-UTRAN Cell Global Identifier Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   connecting a local area network (LAN) base station to a user equipment, wherein the LAN base station and the user equipment are connected with a source macro base station where the user equipment has a dual connectivity with the LAN base station and the source macro base station, wherein the LAN base station has a backhaul connection with the source macro base station for data forwarding;
   after connecting the LAN base station to the user equipment, disconnecting the LAN base station from the source macro base station and connecting the LAN base station to a target macro base station in order to establish a backhaul connection between them for data forwarding, wherein the disconnecting is performed during a handover of the user equipment from the source macro base station to the target macro base station where the user equipment has a dual connectivity with the LAN base station and the target macro base station; and
   transmitting, from the LAN base station, after the handover of the user equipment from the source macro base station to the target macro base station and upon a need to release the user equipment from the LAN base station, context data of the user equipment to the target macro base station and disconnecting the LAN base station from the user equipment, thereby ending the dual connectivity of the user equipment with the LAN base station and the target macro base station, wherein, prior to disconnecting the LAN base station from the user equipment, guaranteeing service continuity for the user equipment based on transmitting the context data of the user equipment in connection with the LAN base station to the target macro base station, and wherein when the LAN base station is connected to the user equipment, the connection of the LAN base station to the user equipment is part of the user equipment being dual connected to one macro base station and to one local area network base station at a time.

2. The method as recited in claim 1, further comprising:
   sending a handover command from the LAN base station to the user equipment,
   wherein, prior to the LAN base station handing over the user equipment to the target macro base station, the user equipment and the target macro base station are in an RRC connected state and where a random access channel (RACH) procedure is not required by the user equipment to send a handover confirmation indication based on the handover command to the target macro base station.

3. The method as recited in claim 1, further comprising:
   during a handover of the user equipment from the LAN base station to the target macro base station, receiving a message at the LAN base station from the user equipment that includes a serving ID associated with the source macro base station to be used by the LAN base station in determining the source macro base station.

4. An apparatus, comprising:
   at least one processor and at least one memory including computer program code,
   the memory and the computer program code configured to cause the apparatus to:
   connect a local area network (LAN) base station to a user equipment, wherein the LAN base station and the user equipment are connected with a source macro base station where the user equipment has a dual connectivity with the LAN base station and the source macro base station, wherein the LAN base station has a backhaul connection with the source macro base station for data forwarding;
   after connecting the LAN base station to the user equipment, disconnect the LAN base station from the source macro base station and connect the LAN base station to a target macro base station in order to establish a backhaul connection between them for data forwarding, wherein the disconnect is performed during a handover of the user equipment from the source macro base station to the target macro base station where the user equipment has a dual connectivity with the LAN base station and the target macro base station;
   transmit, from the LAN base station, after the handover of the user equipment from the source macro base station to the target macro base station and upon a need to release the user equipment from the LAN base station, context data of the user equipment to the target macro base station and disconnect the LAN base station from the user equipment, thereby ending the dual connectivity of the user equipment with the LAN base station and the target macro base station;
   prior to disconnecting the LAN base station from the user equipment, guarantee service continuity for the user equipment based on transmitting the context data of the user equipment in connection with the LAN base station to the target macro base station, wherein when the LAN base station is connected to the user equipment, the connection of the LAN base station to the user equipment is part of the user equipment being dual connected to one macro base station and to one local area network base station at a time.

5. The apparatus as recited in claim 4, where the memory and the computer program code are further configured to cause the apparatus to:
   send a handover command from the LAN base station to the user equipment,
   wherein, prior to the LAN base station handing over the user equipment to the target macro base station, the user equipment and the target macro base station are in an RRC connected state and where a random access channel (RACH) procedure is not required by the user equipment to send a handover confirmation indication based on the handover command to the target macro base station.

6. The apparatus as recited in claim 4, where the memory and the computer program code are further configured to cause the apparatus to:
   during a handover of the user equipment from the LAN base station to the target macro base station, receive a message at the LAN base station from the user equipment that includes a serving ID associated with the source macro base station to be used by the LAN base station in determining the source macro base station.

7. A computer program product, comprising at least one non-transitory computer readable storage medium having a computer readable program code portion stored thereon, the computer readable program code portion comprising:

program code instructions for connecting a local area network (LAN) base station to a user equipment, wherein the LAN base station and the user equipment are connected with a source macro base station where the user equipment has a dual connectivity with the LAN base station and the source macro base station, wherein the LAN base station has a backhaul connection with the source macro base station for data forwarding;

program code instructions for, after connecting the LAN base station to the user equipment, disconnecting the LAN base station from the source macro base station and connecting the LAN base station to a target macro base station in order to establish a backhaul connection between them for data forwarding, wherein the disconnecting is performed during a handover of the user equipment from the source macro base station to the target macro base station where the user equipment has a dual connectivity with the LAN base station and the target macro base station; and program code instructions for transmitting, from the LAN base station, after the handover of the user equipment from the source macro base station to the target macro base station and upon a need to release the user equipment from the LAN base station, context data of the user equipment to the target macro base station and disconnecting the LAN base station from the user equipment, thereby ending the dual connectivity of the user equipment with the LAN base station and the target macro base station, wherein, prior to disconnecting the LAN base station from the user equipment, guaranteeing service continuity for the user equipment based on transmitting the context data of the user equipment in connection with the LAN base station to the target macro base station, and wherein when the LAN base station is connected to the user equipment, the connection of the LAN base station to the user equipment is part of the user equipment being dual connected to one macro base station and to one local area network base station at a time.

* * * * *